US009578386B2

(12) United States Patent
Qiu et al.

(10) Patent No.: US 9,578,386 B2
(45) Date of Patent: Feb. 21, 2017

(54) METHODS AND APPARATUS TO PROVIDE MESSAGES TO TELEVISION USERS

(71) Applicant: AT&T Intellectual Property I, L.P., Atlanta, GA (US)

(72) Inventors: Chaoxin Charles Qiu, Austin, TX (US); Jeffrey Lee Scruggs, Round Rock, TX (US); John E. Lemay, Austin, TX (US); Jessie Tsae-Jiuan Lee, Austin, TX (US); Diana Maria Cantu, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 14/920,487

(22) Filed: Oct. 22, 2015

(65) Prior Publication Data

US 2016/0100228 A1 Apr. 7, 2016

Related U.S. Application Data

(63) Continuation of application No. 13/606,252, filed on Sep. 7, 2012, now Pat. No. 9,184,937, which is a
(Continued)

(51) Int. Cl.
*H04M 1/64* (2006.01)
*H04N 21/488* (2011.01)
(Continued)

(52) U.S. Cl.
CPC .......... *H04N 21/4882* (2013.01); *H04L 12/58* (2013.01); *H04L 51/24* (2013.01);
(Continued)

(58) Field of Classification Search
CPC ................................................. H04M 3/53333
See application file for complete search history.

(56) References Cited

U.S. PATENT DOCUMENTS 5,414,773 A 5/1995 Handelman
6,748,598 B1 6/2004 De Bot
(Continued)

FOREIGN PATENT DOCUMENTS

JP           07030872      1/1995
JP           2005110067    4/2005
WO         WO2004110080   12/2004

OTHER PUBLICATIONS

Roach, A.B., "Session Initiation Protocol (SIP)-Specific Event Notification," dynamicsoft, Jun. 2002, 31 pages.
(Continued)

*Primary Examiner* — Joseph T Phan
(74) *Attorney, Agent, or Firm* — Hanley, Flight & Zimmerman, LLC

(57) ABSTRACT

Methods and apparatus to provide messages to consumer electronics devices are disclosed. In response to a request from a consumer electronics device for messaging information stored with at least one of a first message provider or a second message provider, determining, with a processor of a mediation system, an identifier associated with the consumer electronics device. Querying, with the processor, a database at the mediation system to determine first and second account identifiers associated with the identifier of the consumer electronics device. When the request is for the messaging information stored with the first message provider, sending, with the processor, a first command to cause the first message provider to forward the messaging information associated with the first message account identifier to the mediation system. When the request is for the messaging information stored with the second message provider, sending, with the processor, a second command to cause the second message provider to forward the messaging information associated with the second message account identifier to the mediation system. Sending, with the processor, the
(Continued)

messaging information received from at least one of the first message provider or the second message provider to the consumer electronics device.

16 Claims, 10 Drawing Sheets

Related U.S. Application Data continuation of application No. 11/669,591, filed on Jan. 31, 2007, now Pat. No. 8,266,664.

(51) Int. Cl.

| | |
|---|---|
| *H04L 12/58* | (2006.01) |
| *H04M 3/533* | (2006.01) |
| *H04N 21/235* | (2011.01) |
| *H04N 21/462* | (2011.01) |
| *H04N 21/4788* | (2011.01) |
| *H04N 21/643* | (2011.01) |
| *H04N 21/4786* | (2011.01) |
| *H04N 21/61* | (2011.01) |
| *H04M 7/06* | (2006.01) |

(52) U.S. Cl.
CPC ........ *H04L 51/36* (2013.01); *H04M 3/53333* (2013.01); *H04N 21/2356* (2013.01); *H04N 21/4622* (2013.01); *H04N 21/4786* (2013.01); *H04N 21/4788* (2013.01); *H04N 21/6125* (2013.01); *H04N 21/6131* (2013.01); *H04N 21/6137* (2013.01); *H04N 21/6181* (2013.01); *H04N 21/6187* (2013.01); *H04N 21/64322* (2013.01); *H04M 7/063* (2013.01); *H04M 2207/14* (2013.01)

(56) References Cited

U.S. PATENT DOCUMENTS

| | | | |
|---|---|---|---|
| 7,277,445 B2 | 10/2007 | Bartfeld et al. | |
| 7,466,810 B1 | 12/2008 | Quon et al. | |
| 7,571,458 B1 | 8/2009 | Eyal | |
| 7,593,513 B2 | 9/2009 | Muller | |
| 7,693,270 B2* | 4/2010 | Beck ................... | H04L 65/1069 379/142.16 |
| 8,266,664 B2* | 9/2012 | Qiu ......................... | H04L 12/58 379/88.14 |
| 9,344,562 B2* | 5/2016 | Moore .............. | H04M 3/42391 |
| 2002/0083139 A1 | 6/2002 | Menez | |
| 2002/0147988 A1 | 10/2002 | Nakano | |
| 2003/0043260 A1 | 3/2003 | Yap et al. | |
| 2003/0086432 A1 | 5/2003 | Bartfeld et al. | |
| 2004/0254995 A1 | 12/2004 | Oka et al. | |
| 2005/0027539 A1 | 2/2005 | Weber et al. | |
| 2005/0099491 A1 | 5/2005 | Miyata | |
| 2007/0039036 A1 | 2/2007 | Sullivan et al. | |
| 2007/0115389 A1 | 5/2007 | McCarthy et al. | |
| 2007/0121584 A1 | 5/2007 | Qiu et al. | |
| 2007/0216760 A1 | 9/2007 | Kondo et al. | |
| 2007/0250845 A1 | 10/2007 | Walter et al. | |
| 2008/0056459 A1 | 3/2008 | Vallier et al. | |
| 2008/0101559 A1 | 5/2008 | Bartfeld et al. | |
| 2008/0109839 A1 | 5/2008 | Bruce et al. | |
| 2008/0109866 A1 | 5/2008 | Thomas et al. | |
| 2008/0117826 A1 | 5/2008 | Qiu et al. | |
| 2008/0177844 A1 | 7/2008 | McCarthy et al. | |
| 2008/0181377 A1 | 7/2008 | Qiu et al. | |
| 2008/0313667 A1 | 12/2008 | Ohtsuki | |
| 2009/0187956 A1 | 7/2009 | Sommer | |
| 2009/0207984 A1 | 8/2009 | Lafreniere et al. | |
| 2009/0328118 A1* | 12/2009 | Ravishankar ..... | H04M 3/42042 725/106 |
| 2010/0037277 A1 | 2/2010 | Flynn-Ripley et al. | |
| 2010/0043039 A1 | 2/2010 | Price et al. | |
| 2010/0073455 A1 | 3/2010 | Iwabuchi et al. | |
| 2010/0115568 A1* | 5/2010 | Gupta ................ | H04N 21/4312 725/106 |
| 2010/0169944 A1 | 7/2010 | Rondeau et al. | |
| 2010/0254370 A1 | 10/2010 | Jana et al. | |
| 2011/0085082 A1* | 4/2011 | Jing .................... | H04L 12/2809 348/552 |
| 2013/0051538 A1 | 2/2013 | Qiu et al. | |
| 2013/0083150 A1* | 4/2013 | Howarter ............ | H04L 65/1069 348/14.03 |
| 2016/0066046 A1* | 3/2016 | Mountain .......... | H04N 21/4131 725/12 |

OTHER PUBLICATIONS

U.S. Appl. No. 11/287,147, "Caller ID Information to Internet Protocol Television Displays," application document, filed Nov. 22, 2005, 69 pages.

U.S. Appl. No. 11/445,121, "Methods and Apparatus to Provide Media Content Created for a Specific Individual Via IPTV," application document, filed Jun. 1, 2006, 25 pages.

U.S. Appl. No. 11/400,906, "System and Method of Providing Call Source Information," application document, filed Apr. 10, 2006, 59 pages.

United States Patent and Trademark Office, "Notice of Allowance," issued in connection with U.S. Appl. No. 11/669,591, mailed May 9, 2012, 21 pages.

United States Patent and Trademark Office, "Non-Final Office Action," issued in connection with U.S. Appl. No. 11/669,591, mailed Oct. 6, 2011, 19 pages.

United States Patent and Trademark Office, "Advisory Action," issued in connection with U.S. Appl. No. 11/669,591, mailed Feb. 15, 2011, 4 pages.

United States Patent and Trademark Office, "Final Office Action," issued in connection with U.S. Appl. No. 11/669,591, mailed Dec. 15, 2010, 21 pages.

United States Patent and Trademark Office, "Non-Final Office Action," issued in connection with U.S. Appl. No. 11/669,591, mailed Jun. 2, 2010, 23 pages.

United States Patent and Trademark Office, "Non-Final Office Action," issued in connection with U.S. Appl. No. 13/606,252, mailed Jun. 18, 2014, 16 pages.

United States Patent and Trademark Office, "Final Office Action," issued in connection with U.S. Appl. No. 13/606,252, mailed Mar. 5, 2015, 7 pages.

United States Patent and Trademark Office, "Notice of Allowance," issued in connection with U.S. Appl. No. 13/606,252, mailed Jul. 7, 2015, 14 pages.

* cited by examiner

METHODS AND APPARATUS TO PROVIDE MESSAGES TO TELEVISION USERS

CROSS REFERENCE TO RELATED APPLICATION

This patent arises from a continuation of, and claims priority to, U.S. application Ser. No. 13/606,252, filed Sep. 7, 2012, entitled "Methods and Apparatus to Provide Messages to Television Users," which arises from a continuation of, and claims priority to, U.S. application Ser. No. 11/669,591, filed Jan. 31, 2007, entitled "Methods and Apparatus to Provide Messages to Television Users," now U.S. Pat. No. 8,266,664. U.S. Pat. No. 8,266,664 and U.S. application Ser. No. 13/606,252 are hereby incorporated herein by reference in their entirety.

FIELD OF THE DISCLOSURE

This disclosure relates generally to communication systems and, more particularly, to methods and apparatus to provide messages to television users.

BACKGROUND

Media users typically subscribe to multiple media and messaging services (e.g., television services, telephone services (land line and/or cellular), voice over internet protocol (VoIP) services, instant messaging services, text messaging services, electronic mail (email) services, voicemail services, etc.). The media and messaging services may be provided by a single media provider or may be provided by multiple different providers. For example, a first provider may provide email services while a second provider provides telephone services and television services.

DETAILED DESCRIPTION

Recently, multiple telecommunication services (e.g., VoIP services, internet protocol television (IPTV) services, etc.) have been communicatively linked together. By linking telecommunication services, notifications associated with one service can be transmitted to a user via a second service. For example, notifications associated with a VoIP service can be transmitted using an IPTV service. Example methods and apparatus for transmitting VoIP communication system notifications over an IPTV system are described in U.S. patent application Ser. Nos. 11/287,147, 11/445,121, 11/400,906, and 11/561,944, which are hereby incorporated by reference.

Figure 1:
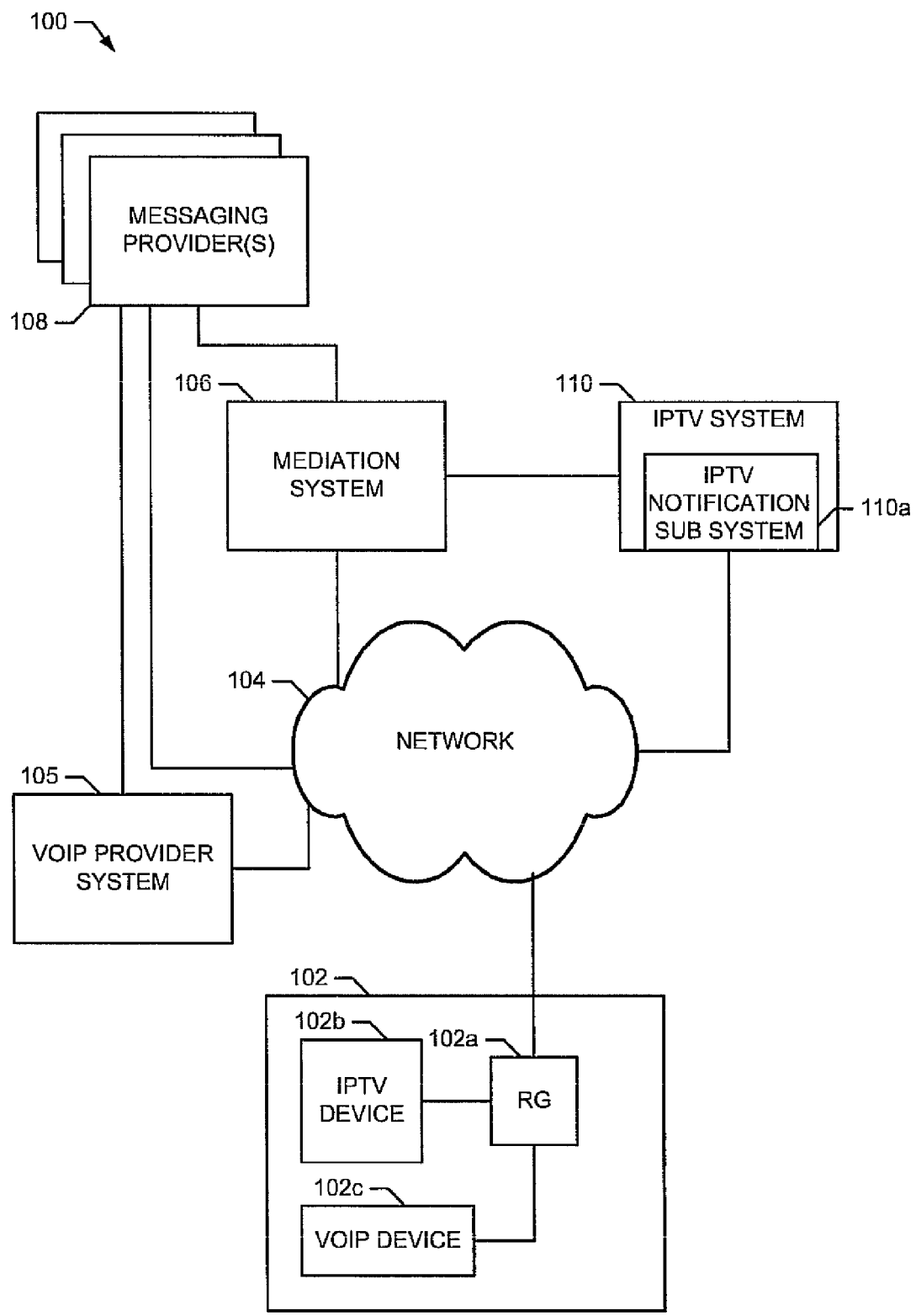
FIG. 1 is a block diagram of an example system for presenting messages to television users.

FIG. 1 is a block diagram of an example system 100 for providing messages to television users. In the illustrated example, messages (e.g., voicemail messages, text messages, electronic mail (email) messages, etc.) are transmitted to an internet protocol television (IPTV) system 110 for presentation to television users. For example, messages may be displayed on a television at a user location. The example system 100 includes a mediation system 106 to associate IPTV accounts with associated accounts on other messaging services. For example, the mediation system 106 may associate a user's IPTV account with one or more of the user's email account(s), voicemail account(s), text messaging account(s), etc.

The example system 100 includes a user location 102, a network 104, a VoIP provider system 105, the mediation system 106, a messaging provider(s) 108, and an IPTV system 110. Persons of ordinary skill in the art will recognize that additional devices may be provided in the example system 100. For example, the consumer location 102 may include a computer and/or any other device connected to the network 104.

In the illustrated example, the user location 102 comprises a residential gateway 102a, an IPTV device 102b, and a VoIP device 102c. The first user location may be a household, a business, a public place, or any other location where users can receive IPTV media content. Further, the user location may include more than one physical location. For example, the IPTV device 102b need not be located near the VoIP device 102c and/or both devices may be connected to different residential gateways (e.g., residential gateway 102a and another residential gateway (not shown)).

The residential gateway 102a of the illustrated example is connected to the network 104. The examples residential gateway 102a sends data to and receives data from other devices connected to the network 104. In the illustrated example, the residential gateway 102a sends internet protocol data to and receives internet protocol data from the mediation system 106, the messaging provider(s) 108, the IPTV system 110, and/or any other device connected to the network 104 (e.g., a voice over internet protocol (VoIP) provider system 105). In the illustrated example, the residential gateway 102a receives IPTV media content and messages from the IPTV system 110. In addition, in the illustrated example, the residential gateway 102a sends requests for messages to the mediation system 106 via the network 104 and the IPTV system 110 and receives messages for display from the mediation system 106 via the network 106 and the IPTV system 110.

The residential gateway 102a of the illustrated example is implemented by an asynchronous digital subscriber line (ADSL) transmission unit-remote (ATU-R). However, the residential gateway 102a may alternatively be implemented by a set top box, a cable modem, a dial-up modem, or any other type of communication device. The residential gateway 102a may include IPTV reception capabilities and/or VoIP capabilities. One or both of those functions (IPTV and/or VoIP) may be included in the same and/or separate devices (e.g., the IPTV device 102b and/or the VoIP device 102c). In an alternate embodiment, the residential gateway 102a may be connected to an optical network unit (ONU) via its uplink Ethernet port if the access link is provided by gigabit-capable passive optical network (GPON)/fiber-to-the-premises (FTTP) technology.

The IPTV device 102b of the illustrated example communicates with the IPTV system 110 via the residential gateway 102a and the network 104 to receive IPTV media content and/or messages. The IPTV device 102b of the illustrated example includes a display for presenting the IPTV media content and/or messages to users. Alternatively, a separate display device may be connected to the IPTV device 102b.

The IPTV device 102b of the illustrated example receives messages from the IPTV system 110. For example, the IPTV device 102b receives messages from the messaging provider(s) 108 via the mediation system 106. A message may be a notification that new messages are waiting at the messaging provider(s) 108, may be a message (e.g., a voicemail, a text message, an email) received by the messaging provider(s) 108, may be a message associated with the IPTV system 110, or may be any other message.

The example IPTV device 102b presents received messages to users. The IPTV device 102b of the illustrated example presents messages via a remote desktop protocol (RDP) connection to the IPTV system 110. Alternatively, the IPTV device 102b may be implemented with HTTP applications, such as Internet Explorer, and use HTTP to communicate with the IPTV system 110. Received messages may be presented as a display of text, an audio presentation, a video presentation, etc. The IPTV device 102b may include the ability to convert messages from one presentation type to another (e.g., from text to audio, from video to audio, from text to video, from audio to text, from video to text, etc.).

The VoIP device 102c of the illustrated example is capable of initiating and receiving VoIP communications. To this end, the example VoIP device 102c connects to and authenticates with a VoIP provider system 105. The VoIP provider system 105 is communicatively coupled to the VoIP device 102c via the network 104 and the residential gateway 102a. The example VoIP provider system 105 provides the capability to make and receive VoIP communication session (phone calls). In addition, the VoIP provider system 105 may include a voicemail capability provided by a voicemail provider, which may be one of the messaging provider(s) 108. The example VoIP device 102c of FIG. 1 includes a phone adapter and handset. Alternatively, the VoIP device 102c may be a handset connected to a VoIP capable residential gateway (e.g., residential gateway 102a), a router with VoIP capabilities connected to a handset, a personal computer executing software that provides VoIP capabilities, etc. Persons of ordinary skill in the art will recognize that additional VoIP devices, like VoIP device 102c, may be connected to the network 104 through the RG 102a or using any other type of connection. Additionally or alternatively, other communication devices such as public switch telephone network (PSTN) devices and/or time division multiplexed (TDM) devices may be at the consumer location 102.

While the example system 100 of FIG. 1 includes a single user location 102, any number of user locations may be associated with the system 100. In addition, the user locations associated with the system 100 may include some or all of a residential gateway (e.g., residential gateway 102a), an IPTV device (e.g., IPTV device 102b), a VoIP device (e.g., VoIP device 102c), and/or any other device(s). The user locations may include other device such as, for example, cellular telephones, mobile telephones, personal computers, laptop computers, plain old telephone system (POTS) telephones, etc. Some or all of the devices at the user location 102 may be associated with accounts at the messaging provider(s) 108.

The network 104 of the illustrated example is a broadband communications network. The network 104 may be implemented by one or more of any type of local area network, wide area network, public network, private network, public switched telephone network, broadband network, and/or any other type of communication link.

The mediation system 106 of the illustrated example facilitates communication between the messaging provider(s) 108 and the IPTV system 110. The example mediation system 106 receives requests for messaging information from the user location 102 via the network 104 and/or the IPTV system 110. The example mediation system 106 associates identifiers of IPTV users with identifiers for messaging provider(s) 108 and vice versa. In addition, the example mediation system sends messages and notifications associated with the messaging provider(s) 108 to the user location 102 (e.g., the IPTV device 102b) via the IPTV system 110 and the network 104. The mediation system 106 of the illustrated example converts messages from the messaging provider(s) 108 into messages that are capable of being handled by the IPTV system 110. For example, the mediation system 106 may convert a message that is formatted as a Microsoft® Word document into a markup language format (e.g., a hypertext markup language (HTML), an extensible markup language (XML) format, simple object access, etc.). In another example, the mediation system 106 may convert an audio message into text using, for example, a speech-to-text engine included in the mediation system 106. In another example, the mediation system 106 may convert a video message from one video encoding format to another, may convert an audio message from one audio encoding format (e.g., Motion Pictures Expert Group (MPEG) layer three (MP3)) to another, etc.

The IPTV system 110 of the illustrated example receives media content from media content producers (e.g., television networks, movie studios, etc.) and transmits the media content to users (e.g., the user location 102) via the example network 104. The example IPTV system 110 includes an IPTV notification sub-system 110a. The IPTV notification sub-system 110a sends notification messages, alerts, etc. to IPTV users for display on IPTV devices (e.g., the IPTV device 102b). In the illustrated example, the IPTV notification sub-system 110a receives messages including IPTV account information from the mediation system 106 and transmits the notification messages to the IPTV devices specified by the IPTV account information. The example IPTV system 110 may include other subsystems such as, for example, a remote terminal server, a web application server, a web browser, etc. The IPTV system 110 is described in further detail in U.S. patent application Ser. Nos. 11/287, 147, 11/445,121, 11/400,906, and 11/561,944, which have been incorporated by reference.

Figure 2:
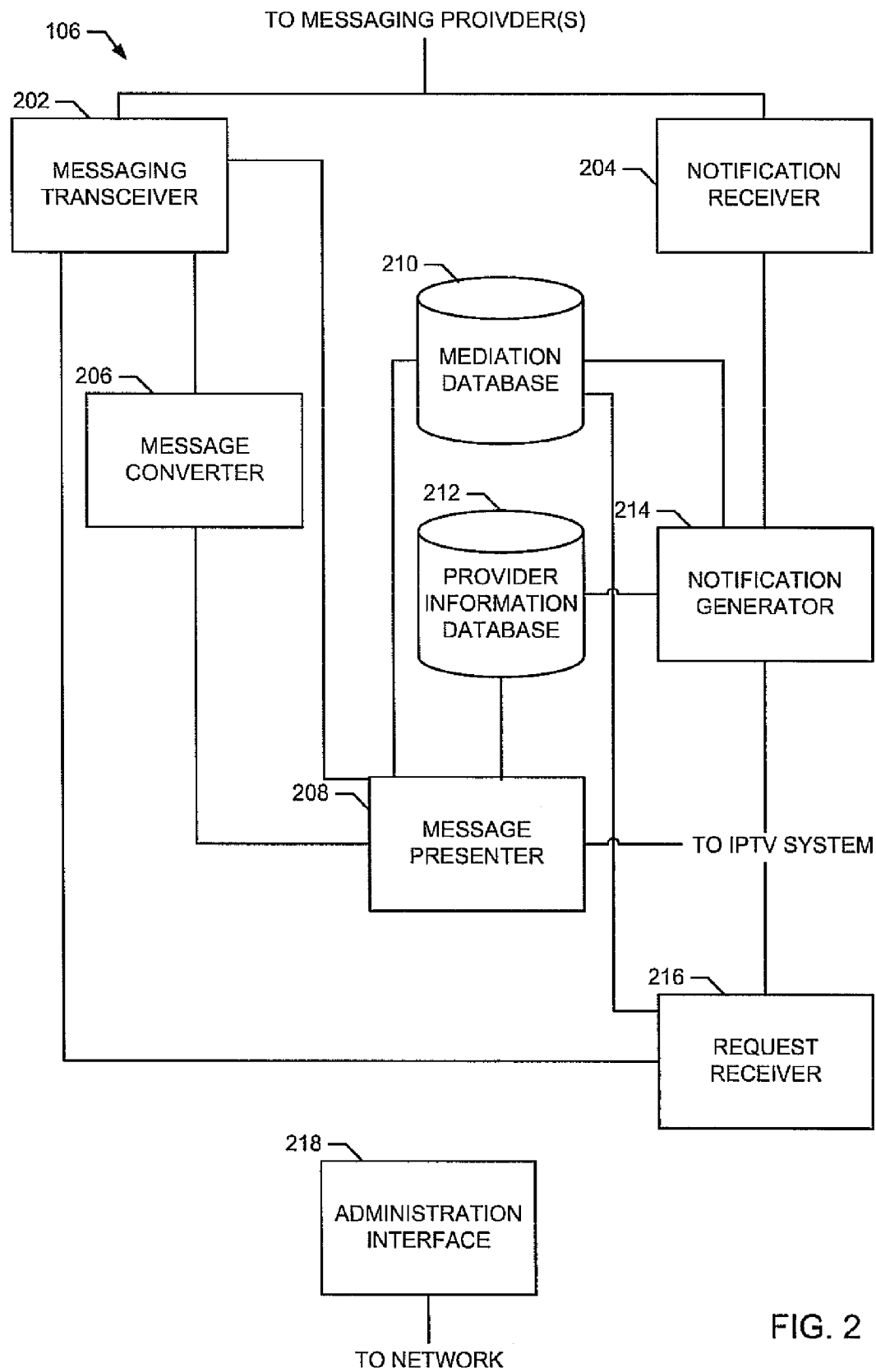
FIG. 2 is a block diagram of an example implementation of the mediation system of FIG. 1.

FIG. 2 illustrates an example implementation of the mediation system 106 of FIG. 1. The example mediation system 106 includes a messaging transceiver 202, a notification receiver 204, a message converter 206, a message presenter 208, a mediation database 210, a provider information database 212, a notification generator 214, a request receiver 216, and an administration interface 218.

The messaging transceiver 202 of the illustrated example sends requests for messages to the messaging provider(s) 108 of FIG. 1 and receives messages from the messaging provider(s) 108. The example messaging transceiver 202 receives the requests for messages from television users via the request receiver 216. The example messaging transceiver 202 sends messages received from the messaging provider(s) 108 to the message converter 206. Alternatively, the messaging transceiver 202 may send messages directly to the message presenter 208 if no message conversion is desired.

The notification receiver 204 of the illustrated example receives notifications from the messaging provider(s) 108. In the illustrated example, the notifications indicate that new messages are available at one or more of the messaging provider(s) 108. For example, if an email messaging provider receives a new email for a user that is configured for notification via the mediation system 106, the messaging provider will send a notification to the notification receiver 204. The notification receiver 204 listens for notifications from the messaging provider(s) 108. The messaging provider(s) 108 may be manually configured to send notifications to the notification receiver 205, the notification receiver 205 may subscribe to notifications from the messaging provider(s) 108, or the messaging provider(s) 108 may be configured in any other method. Alternatively, the notification receiver 204 may allow the messaging provider(s) 108 to access an application program interface (API) that allows the messaging provider(s) 108 to indicate that new messages are available. The notification receiver 204 transmits notifications to the notification generator 214.

The message converter 206 of the illustrated example receives messages from the messaging transceiver 202 and converts the messages to make them suitable for presentation to users. The message converter 206 may convert the message between different encoding formats (e.g., from a Microsoft® Word document to a plain text document, from a compressed format to an uncompressed format, from a plain text document to a XML document, from a plain text document to an HTML document, etc.), between different presentation formats (e.g., from text to speech, from speech to text, from video to audio, etc.), between different encoding formats (e.g., MP3, waveform audio format (WAV), Windows® media audio (WMA), etc.) between different display layouts (e.g., from a table to a column of text, from a small font to a large font, from italicized to plain, etc.), or any other conversion. The message converter 206 sends converted messages to the message presenter 208.

The message presenter 208 of the illustrated example receives messages from the message converter 206 (or from the message transceiver 202 (e.g., if no message conversion is desired)) and generates a display for presentation via the IPTV system 110 of FIG. 1. The example message presenter 208 may perform some format adjustments such as, for example, font size adjustment, font color adjustment, adjusting message positioning, etc.). For example, the message presenter 208 may generate graphical user interface (GUI) elements to provide the display (e.g., scroll bars for scrolling through the text of the message, a text box for displaying the body of the messages, a text box for displaying the attributes of the message (e.g., subject, "to" field, "from" field," etc.), etc. In addition, the message presenter 208 may adjust the message to make it better suited for display. For example, the message presenter 208 may adjust the text of the body of a message to cause the text to wrap so that it fits in a narrower text box than that for which the message was originally created. When the message is audio or video, the message presenter 208 may generate a GUI object that is capable of presenting the audio and/or video (e.g., a video player, an audio player, etc.). Alternatively, if the IPTV system 110 is capable of handling (e.g., receiving and sending to users for presentation) audio and/or video, the message presenter 208 may send the audio and video directly to the IPTV system 108. Alternatively, the example message converter 206 may include an interface to the provider information database 212 so that it may query the provider information database 212 for directions/guidelines on how to handle message conversion.

To determine how messages should be converted, the message presenter 208 of the illustrated example queries the provider information database 212 for information about messages from the message provider(s) 108. For example, different message providers may store the same information in different fields or locations in a document. By querying the provider information database 212 with identity information associated with the messaging provider(s) 108, the message presenter 208 can receive information describing messages from the messaging provider(s) 108.

In addition to generating display/presentation elements for messages, the message presenter 208 of the illustrated example, determines the destination IPTV account for the messages. In the illustrated example, the message presenter 208 makes this determination by extracting information from the messages (e.g., the email account to which an email was addressed, the phone number or telephone account number to which a voicemail was addressed, etc.) and querying the mediation database 210 to determine an IPTV account identifier associated with the destination of the messages. Alternatively, the message presenter 208 may use any other method to determine the intended IPTV account identifier address associated with a given message. In addition, a given message may be associated with any number of IPTV accounts (e.g., a mobile phone voicemail account may be associated with an IPTV account at a first location and an IPTV account at a second location). Accordingly, the message presenter 208 is capable of determining all of the IPTV accounts associated with a message.

The mediation database 210 of the illustrated example stores information that associates accounts/destinations of the messaging provider(s) 108 of FIG. 1 with the accounts of the IPTV system 110. The mediation database 210 of the illustrated example is a database that stores records that associate messaging provider account identifiers (e.g., usernames, email addresses, phone numbers, account numbers, network addresses, etc.) with corresponding IPTV account identifiers (e.g., an account number, telephone number, etc.). Alternatively, the mediation database 210 may be any other type of data storage such as a file, a directory, data stored on a hard disk drive, etc.

The provider information database 212 of the illustrated example stores information about the messaging provider(s) 108 and/or the format and structure of messages associated with the messaging provider(s) 108. For example, the provider information database 212 may store a format (e.g., a data encoding, etc.) of a messaging provider, a data layout (e.g., an indication of where data is stored in the message), etc. Accordingly, the provider information database 212 allows the mediation system 106 to work with multiple messaging providers that use different message media types. In addition, the provider information database 212 may store information about how to request notification of new messages from the different messaging provider(s) 108. For example, the provider information database 212 may store a network location of the messaging provider and an indication of what commands may be used to subscribe to notifications.

The notification generator 214 receives notifications from the notification receiver 204 and processes them to prepare them for display on the IPTV device 102b of FIG. 1. For example, the notification generator 214 may format the notification so that it can be handled by the notification subsystem of the IPTV system 110. To determine how to handle notifications and determine the messaging provider account associated with the notification, the notification generator 214 of the illustrated example queries the provider information database 212 for information about notifications from the messaging provider(s) 108. In addition, the notification generator 214 determines the IPTV account destination(s) for the notification and includes the IPTV account destination information with the notification that is sent to the IPTV system 110. To determine the IPTV account destination information, the notification generator 214 of the illustrated example queries the mediation database 210 with the messaging provider account information associated with the notification. Persons of ordinary skill in the art will recognize that the notification generator 214 may be integrated with the message presenter 208 (i.e., they may be the same device).

The request receiver 216 of the illustrated example receives requests for message presentation from IPTV users (e.g., the user location 102). According to the illustrated example, the request may specify a particular messaging provider for which a message summary should be presented, a particular message that should be presented a particular message or group of messages that should be deleted, a particular message or group of messages that should be marked as read or unread, a summary of all messages from all messaging providers that should be presented, etc. The request receiver processes the request(s) and sends the request(s) to the message transceiver 202. Upon receiving a request from an IPTV device, the request receiver 216 queries the mediation database 210 for associated messaging provider accounts and queries the provider information database 212 for messaging provider information, including information and guidelines on presentation format. This information is bundled and sent to the messaging transceiver 202 to request messages or other information from messaging providers. In this example implementation, the messaging transceiver 202 and the message converter 206 do not need to query the database 212 when handling format conversion.

The administration interface 218 provides a user interface to allow configuration of the mediation system 106. In the illustrated example, the administration interface 218 is a webpage interface. Alternatively, the administration interface 218 may be provided by any other type of interface. The administration interface 218 may allow configuration of records in the mediation database 210, information in the provider information database 212, etc. The administration interface 218 is connected to the network 104 to allow configuration access by other devices connected to the network 104. Alternatively, the administration interface 218 may be directly connected to other devices, may be wirelessly connected to other devices, etc. The administration interface 218 of the illustrated example is protected by a username and password. The administration interface 218 may additionally support secure access channels, such as internet protocol (IP) security (IPSec) or hyper text transfer protocol (HTTP) over secure socket layer (SSL) (HTTPS). The administration interface 218 may include multiple usernames and passwords that enable different levels of secure access to the administration interface 218. For example, a first access level may enable a user to modify associations between IPTV accounts and messaging provider accounts and a second access level may enable a user to modify the associations as well as to modify information stored in the provider information database 212. The administration interface 218 may alternatively use any other type of authentication or may not use any authentication.

FIGS. 3-6 are flowcharts representative of example machine readable instructions that may be executed to implement the example VoIP provider system 105, mediation system 106, the example messaging provider(s) 108, the example IPTV system 110, and the example IPTV notification sub-system 110a, of the example system 100 of FIG. 1 and the messaging transceiver 202, the notification receiver 204, the message converter 206, the message presenter 208, the mediation database 210, the provider information database 212, the notification generator 214, the request receiver 216, and the administration interface 218 of the example mediation system 106 of FIG. 2. The example machine readable instructions of FIGS. 3-6 may be executed by a processor, a controller, and/or any other suitable processing device. For example, the example machine readable instructions of FIGS. 3-6 may be embodied in coded instructions stored on a tangible medium such as a flash memory, or random access memory (RAM) associated with a processor (e.g., the processor 1012 shown in the example processor platform 1000 and discussed below in conjunction with FIG. 10). Alternatively, some or all of the example flowcharts of FIGS. 3-8 may be implemented using an application specific integrated circuit (ASIC), a programmable logic device (PLD), a field programmable logic device (FPLD), discrete logic, hardware, firmware, etc. In addition, some or all of the example flowcharts of FIGS. 3-6 may be implemented manually or as combinations of any of the foregoing techniques, for example, a combination of firmware, software, and/or hardware. Further, although the example machine readable instructions of FIGS. 3-6 are described with reference to the flowcharts of FIGS. 3-6, persons of ordinary skill in the art will readily appreciate that many other methods of implementing the example VoIP provider system 105, mediation system 106, the example messaging provider(s) 108, the example IPTV system 110, and the example IPTV notification sub-system 110a, of the example system 100 of FIG. 1 and the messaging transceiver 202, the notification receiver 204, the message converter 206, the message presenter 208, the mediation database 210, the provider information database 212, the notification generator 214, the request receiver 216, and the administration interface 218 of the example mediation system 106 of FIG. 2 may be employed. For example, the order of execution of the blocks may be changed, and/or some of the blocks described may be changed, eliminated, sub-divided, and/or combined. Additionally, persons of ordinary skill in the art will appreciate that the example machine readable instructions of FIGS. 3-6 be carried out sequentially and/or carried out in parallel by, for example, separate processing threads, processors, devices, circuits, etc.

Figure 3:
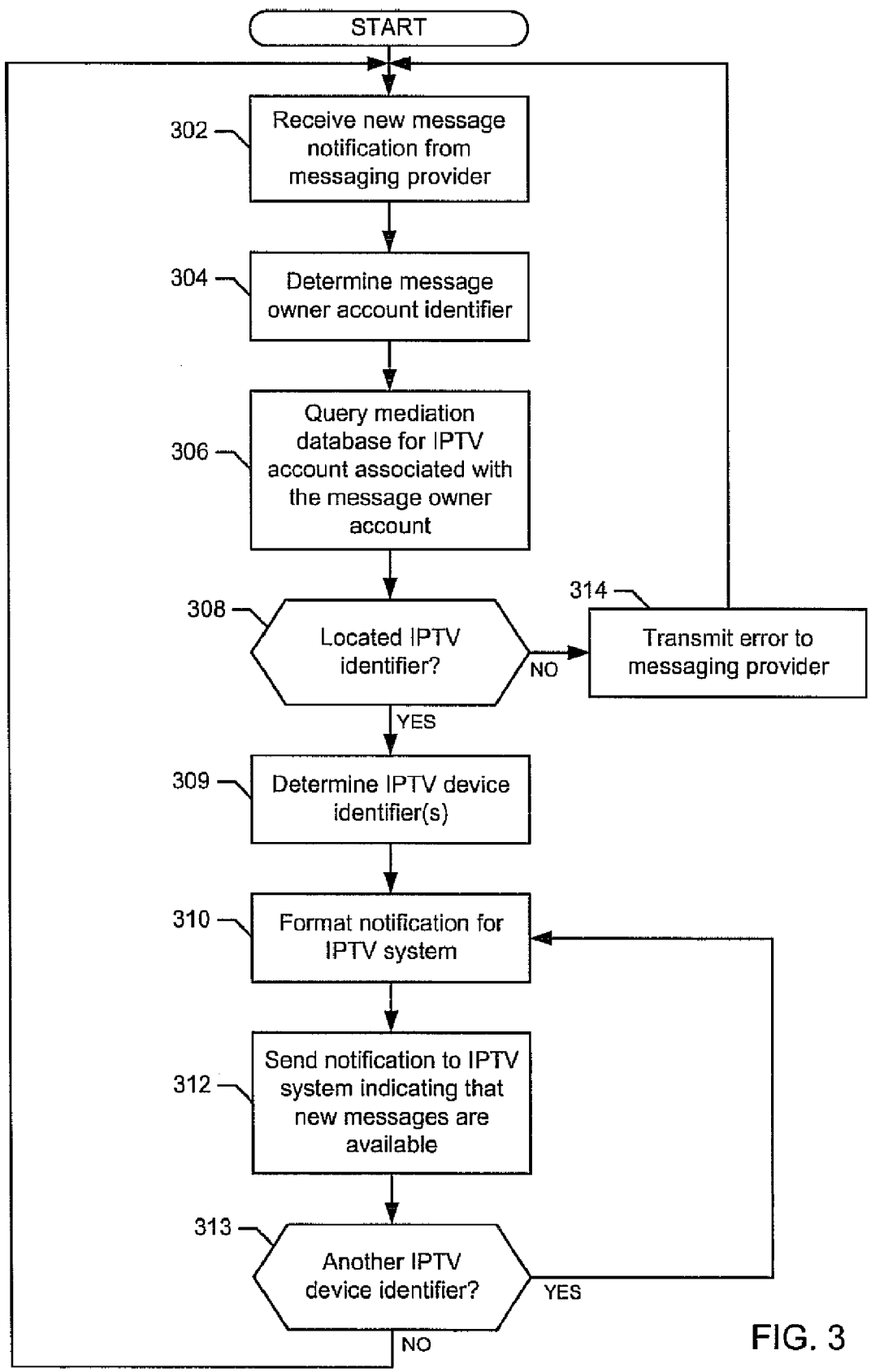
FIGS. 3 to 8 are a flowcharts representative of example machine readable instructions that may be executed to implement the example mediation system of FIG. 1.

FIG. 3 is a flowchart representative of example machine readable instructions that may be executed to handle message notifications at the mediation system 106 (e.g., notifications regarding new email messages, voicemail messages, text messages, etc.). The example machine readable instructions of FIG. 3 begin when the notification receiver 204 of FIG. 2 receives a new message notification from a messaging provider 108 of FIG. 1 (block 302).

The example notification generator 214 then determines the message owner account identifier or any other identifier that identifies the messaging provider account associated with the notification (block 304). For example, the notification generator 214 may parse the information in the notification to determine a username, email address, phone number, etc. associated with the notification. Alternatively, the notification generator may query an application program interface (API) for message information. Using the message owner account identifier, the example notification generator 214 queries the mediation database 210 to determine the IPTV account(s) associated with the message owner account identifier (i.e., the IPTV account(s) that should receive the notification) (block 306).

The example notification generator 214 then determines if an IPTV account associated with the identifier is located in the mediation database 210 (block 308). If an IPTV account was not located in the mediation database 210 (block 308), the notification generator transmits an error to the messaging provider indicating that an IPTV account associated with the notification was not located (block 314). Control then returns to block 302 to wait for the next notification from the example messaging provider(s) 108. Alternatively, such errors may be dropped without error response to the messaging provider who sent the notification.

If an IPTV account associated with the identifier was located in the mediation database 210 (block 308), the example notification generator 214 determines one or more IPTV device identifiers associated with the IPTV account (block 309). The example notification generator 214 formats the notification including the first IPTV device identifier for presentation via the IPTV system 110 of FIG. 1 (block 310). Then, the notification generator 214 of the illustrated example transmits the notification to the IPTV system 110 (block 312). The example notification generator 214 then determines if another IPTV device identifier was located in block 309 (block 313). If another IPTV device identifier was located, control returns to block 310 to continue sending notifications. If another IPTV device identifier was not located (block 313), control returns to block 302 to wait for the next notification from the example messaging provider(s) 108.

In an alternate implementation, the IPTV system 110 and/or the notification generator 214 may determine if the IPTV device specified by the IPTV device identifier is set to disable notifications. If the IPTV device is set to disable notification, the notification message is dropped and is not presented on the IPTV device (or a connected presentation device).

Figure 4:
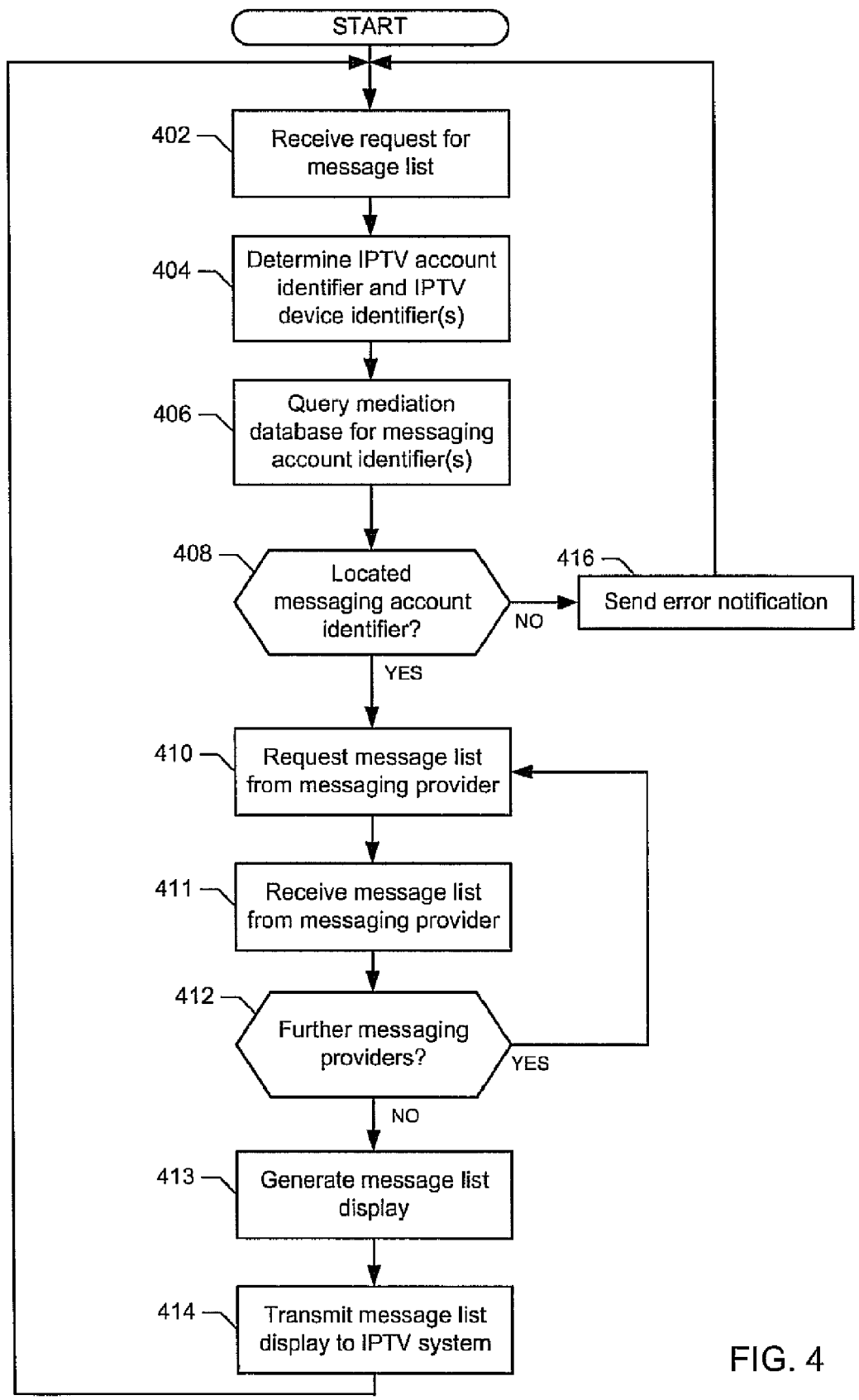

FIG. 4 is a flowchart representative of example machine readable instructions that may be executed to handle a request for a message list at the example mediation system 106 of FIG. 1. The example machine readable instructions of FIG. 4 begin when the request receiver 216 of FIG. 2 receives a request for a message list (block 402). The request may be for a message list from a specific messaging provider, from a subset of messaging providers, or from all available messaging providers. The request receiver 216 then determines an IPTV account identifier and IPTV device identifiers associated with the request (block 404). For example, the request receiver 216 may parse the request to determine the source of the request, may receive IPTV account identification information from the IPTV system 110 of FIG. 1, etc.

After determining an IPTV account identifier associated with the request (block 404), the example request receiver 216 queries the mediation database 210 using the IPTV account identifier to determine one or more messaging account identifiers associated with the IPTV account (block 406). For example, the IPTV account identifier may be associated with a voicemail account, a text messaging account, and an email account. The example request receiver 216 then determines if a messaging account identifier associated with the IPTV account identifier was located (block 408). If a messaging account identifier was not located, the request receiver 216 sends an error notification to the IPTV system 110 (block 416). Control then returns to block 402 to wait for the next request.

If one or more of messaging account identifier(s) were located (block 408), the example request receiver 216 sends a request to the first message provider associated with the located messaging account identifier(s) requesting a message list via the corresponding messaging transceiver 202 (block 410). The messaging transceiver 202 then receives message list(s) from the messaging provider(s) and sends the received message list(s) to the message presenter 208 via the message converter 206 (block 411). Alternatively, the messaging transceiver 202 may send some messages to the message presenter 208 if conversion is not desired.

The example message presenter 208 then determines if there are further messaging providers associated with the located message account identifier(s) (e.g., a second message provider associated with a second one of the message account identifiers) (block 415). If there are further messaging providers associated with the located message account identifier(s), control returns to block 410 to continue requesting message lists. The message presenter 208 may query the provider information database 212 for more details on the presentation format. Alternatively, some presentation guidelines can be stored in the message presenter 208 in the form of XML style sheet definitions. If there are no further messaging providers, the message presenter 208 receives the message list(s) and generates a presentation of the message list(s) to be presented via the IPTV system 110 (block 413). The example message presenter 208 then transmits the message list presentation to the IPTV system 110 for presentation at the user location 102 (block 414). Control then returns to block 402 to wait for the next request.

In an alternate implementation, the example message presenter 208 may send a message list from each messaging provider as they are received, rather than aggregating the message list.

Figure 5:
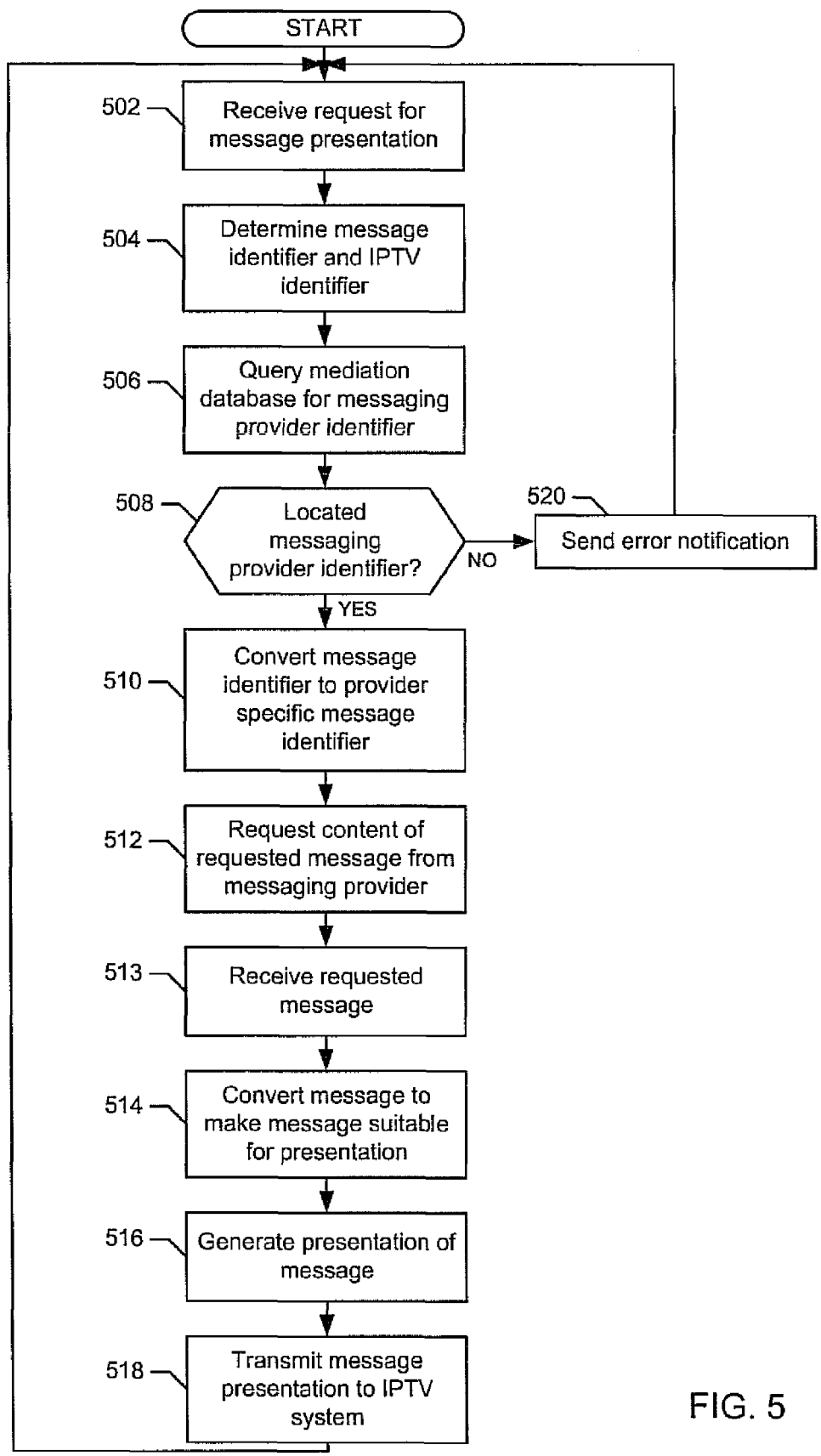

FIG. 5 is a flowchart representative of example machine readable instructions that may be executed to handle a request for message presentation at the example mediation system 106 of FIG. 1. The example machine readable instructions of FIG. 5 begin when the request receiver 216 of FIG. 2 receives a request for message presentation (block 502). The request receiver 216 then determines a message identifier and an IPTV account identifier associated with the request (block 504). For example, the request receiver 216 may parse the request to determine the source of the request, may receive IPTV account identification information from the IPTV system 110 of FIG. 1, etc. In addition, the example request receiver 216 may parse the request to determine an identifier associated with the requested message. Additionally or alternatively, the example request receiver 216 may query the provider information database 212 with information from the request to determine the identity of the requested message.

After determining an IPTV account identifier and message identity associated with the request (block 504), the example request receiver 216 queries the mediation database 210 to determine the messaging provider who has the requested message (block 506). The request receiver 216 also queries for guidelines on format conversion, for example, the message from a message provider may be in MP3, and need to converted to the WMA format before being presented to the IPTV. For example, the IPTV account identifier may be associated with a voicemail account, a text messaging account, and/or an email account. The example request receiver 216 then determines if a messaging provider identifier associated with the IPTV account identifier was located (block 508). If a messaging provider identifier was not located (block 508), the request receiver 216 sends an error notification to the IPTV system 110 (block 520). Control then returns to block 502 to wait for the next request.

If a messaging provider identifier was located (block 508), the example request receiver 216 converts the received message identifier into a provider specific message identifier (e.g., a number that references the message on the system of the messaging provider (block 510). The request receiver then sends a request for the message to the messaging provider associated with the message via the messaging transceiver 202 (block 512).

The messaging transceiver 202 then receives the requested message from the messaging provider associated with the message and sends the received message to the message converter 206 (block 513). The example message converter 206 converts the message to make the message suitable for display via the IPTV system 110 (block 514). Then, the example message presenter 208 generates a presentation for the converted message (block 516). For example, the message presenter 208 may generate a graphical display, an audible presentation, a video display, etc. Then, the example message presenter 208 sends the generated presentation to the IPTV system 110. Control then returns to block 502 to wait for the next request.

Persons of ordinary skill in the art will recognize that when multiple messages are requested, the example mediation system 106 may iterate over the set of requested messages.

Figure 6:
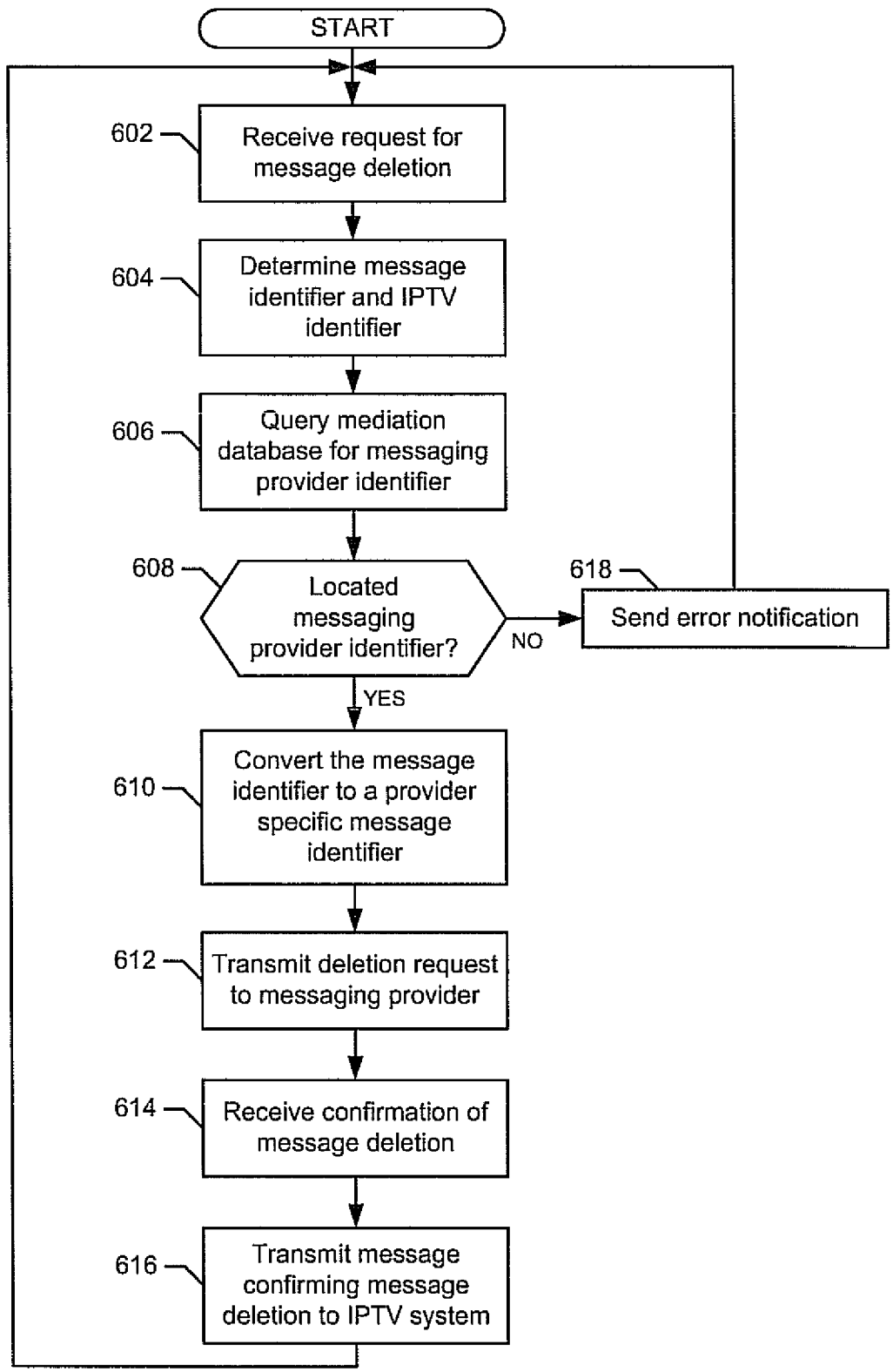

FIG. 6 is a flowchart representative of example machine readable instructions that may be executed to handle a request for message deletion at the example mediation system 106 of FIG. 1. The example machine readable instructions of FIG. 6 begin when the request receiver 216 of FIG. 2 receives a request for message deletion (block 602). The request receiver 216 then determines a message identifier and an IPTV account identifier associated with the request (block 604). For example, the request receiver 216 may parse the request to determine the source of the request, may receive IPTV account identification information from the IPTV system 110 of FIG. 1, etc. In addition, the example request receiver 216 may parse the request to determine an identifier associated with the requested message. Additionally or alternatively, the example request receiver 216 may query the provider information database 212 with information from the request to determine the identity of the requested message.

After determining an IPTV account identifier associated with the request, the example request receiver 216 queries the mediation database 210 using the IPTV account identifier and the message identifier to determine a messaging provider associated with the message to be deleted (block 606). For example, the IPTV account identifier may be associated with a voicemail account, a text messaging account, and/or an email account. The example request receiver 216 then determines if a messaging provider identifier associated with the IPTV account identifier was located (block 608). If a messaging provider identifier was not located, the request receiver 216 sends an error notification to the IPTV system 110 (block 618). Control then returns to block 502 to wait for the next request.

If a messaging provider identifier was located (block 608), the example request receiver 216 converts the received message identifier into a provider specific message (e.g., a number that references the message on the system of the messaging provider (block 610). The request receiver then sends a request for message deletion to the messaging provider associated with the message via the messaging transceiver 202 (block 612).

The messaging transceiver 202 then receives confirmation of deletion of the message from the messaging provider associated with the message and sends the confirmation to the message presenter 208 via the message converter 206 (block 614). Then, the example message presenter 208 generates a presentation for the confirmation (block 616). For example, the message presenter 208 may generate a graphical display, an audible presentation, a video display etc. Then, the example message presenter 208 sends the generated presentation to the IPTV system 110 (block 616). Control then returns to block 602 to wait for the next request. Alternatively, the IPTV system 110 may remove the deleted message from the message lists display.

Persons of ordinary skill in the art will recognize that when multiple messages are requested, the example mediation system 106 may iterate over the set of requested messages.

Figure 7:
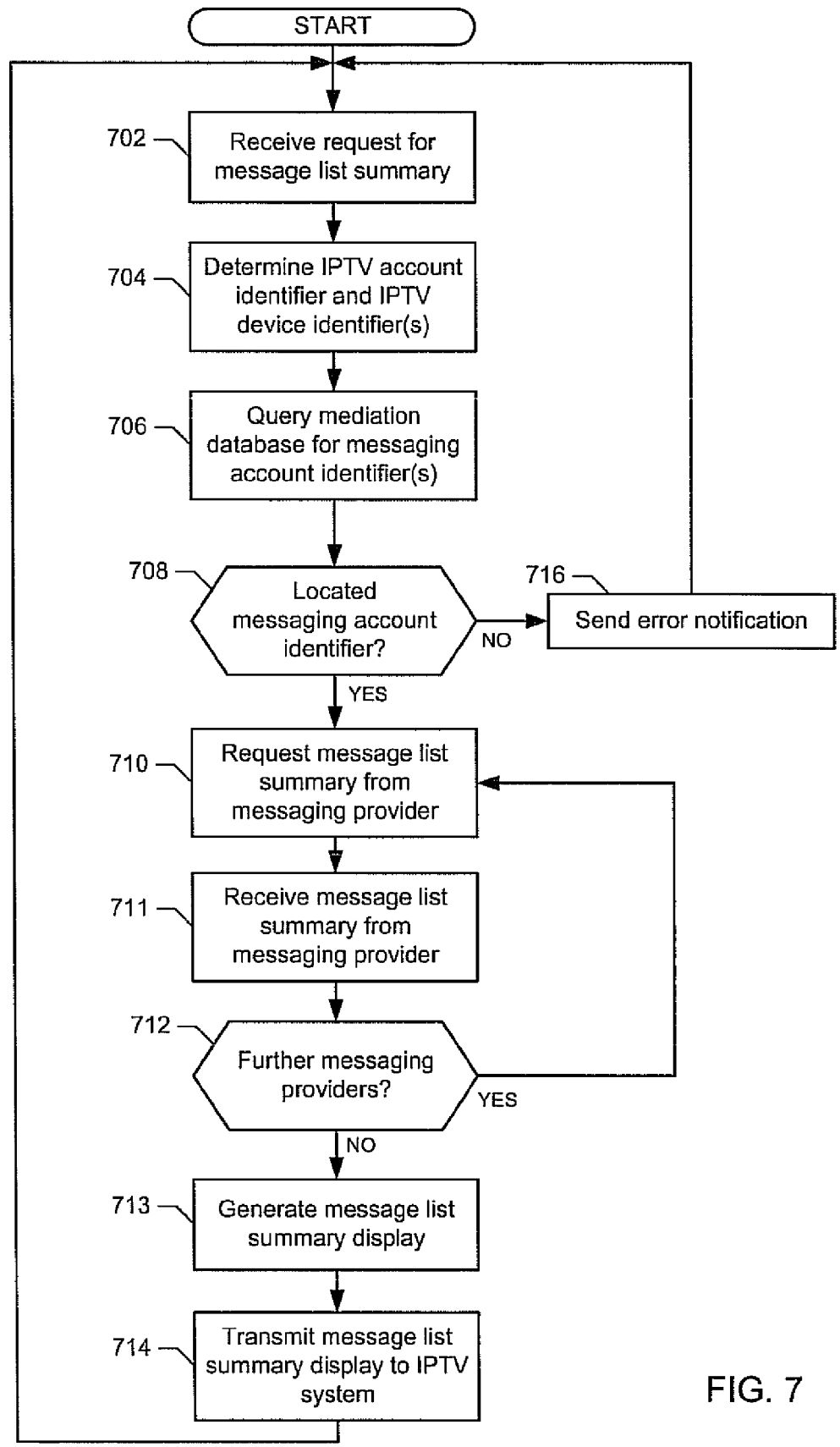

FIG. 7 is a flowchart representative of example machine readable instructions that may be executed to handle a request for a message list summary (e.g., a summary of the message status at one or more messaging providers such as, 5 new messages, 2 unread messages, 40 total messages) at the example mediation system 106 of FIG. 1. The example machine readable instructions of FIG. 7 begin when the request receiver 216 of FIG. 2 receives a request for a message list summary (block 702). The request may be for a message list summary from a specific messaging provider, from a subset of messaging providers, or from all available messaging providers. The request receiver 216 then determines an IPTV account identifier and IPTV device identifiers associated with the request (block 704). For example, the request receiver 216 may parse the request to determine the source of the request, may receive IPTV account identification information from the IPTV system 110 of FIG. 1, etc.

After determining an IPTV account identifier associated with the request (block 704), the example request receiver 216 queries the mediation database 210 using the IPTV account identifier to determine one or more messaging account identifiers associated with the IPTV account (block 706). For example, the IPTV account identifier may be associated with a voicemail account, a text messaging account, and an email account. The example request receiver 216 then determines if a messaging account identifier associated with the IPTV account identifier was located (block 708). If a messaging account identifier was not located, the request receiver 216 sends an error notification to the IPTV system 110 (block 716). Control then returns to block 702 to wait for the next request.

If one or more of messaging account identifier(s) were located (block 708), the example request receiver 216 sends a request to the first message provider associated with the located messaging account identifier(s) requesting a message list summary via the corresponding messaging transceiver 202 (block 710). The messaging transceiver 202 then receives message list summary(s) from the messaging provider(s) and sends the received message list summary(s) to the message presenter 208 via the message converter 206 (block 711). The example message presenter 208 then determines if there are further messaging providers associated with the located message account identifier(s) (e.g., a second message provider associated with a second one of the message account identifiers) (block 712). If there are further messaging providers associated with the located message account identifier(s), control returns to block 710 to continue requesting and sending message list summaries.

If there are no further messaging providers (block 712), the example message presenter 208 receives the message list summary(s) and generates a presentation of the message list summary(s) to be presented via the IPTV system 110 (block 713). The example message presenter 208 then transmits the message list summary presentation to the IPTV system 110 for presentation at the user location 102 (block 714). Control then returns to block 702 to wait for the next request.

In an alternate implementation, the message list summary may include a summary for each provider (including the name of the provider in the summary), a summary for each type of provider (e.g., all voicemail messages are summarized in one summary and all emails are summarized in a second summary), a summary for all providers, etc. Alternatively, an application in the IPTV 102b may run in the background to request the message list summary periodically and update a footnote presentation on the TV screen.

Figure 8:
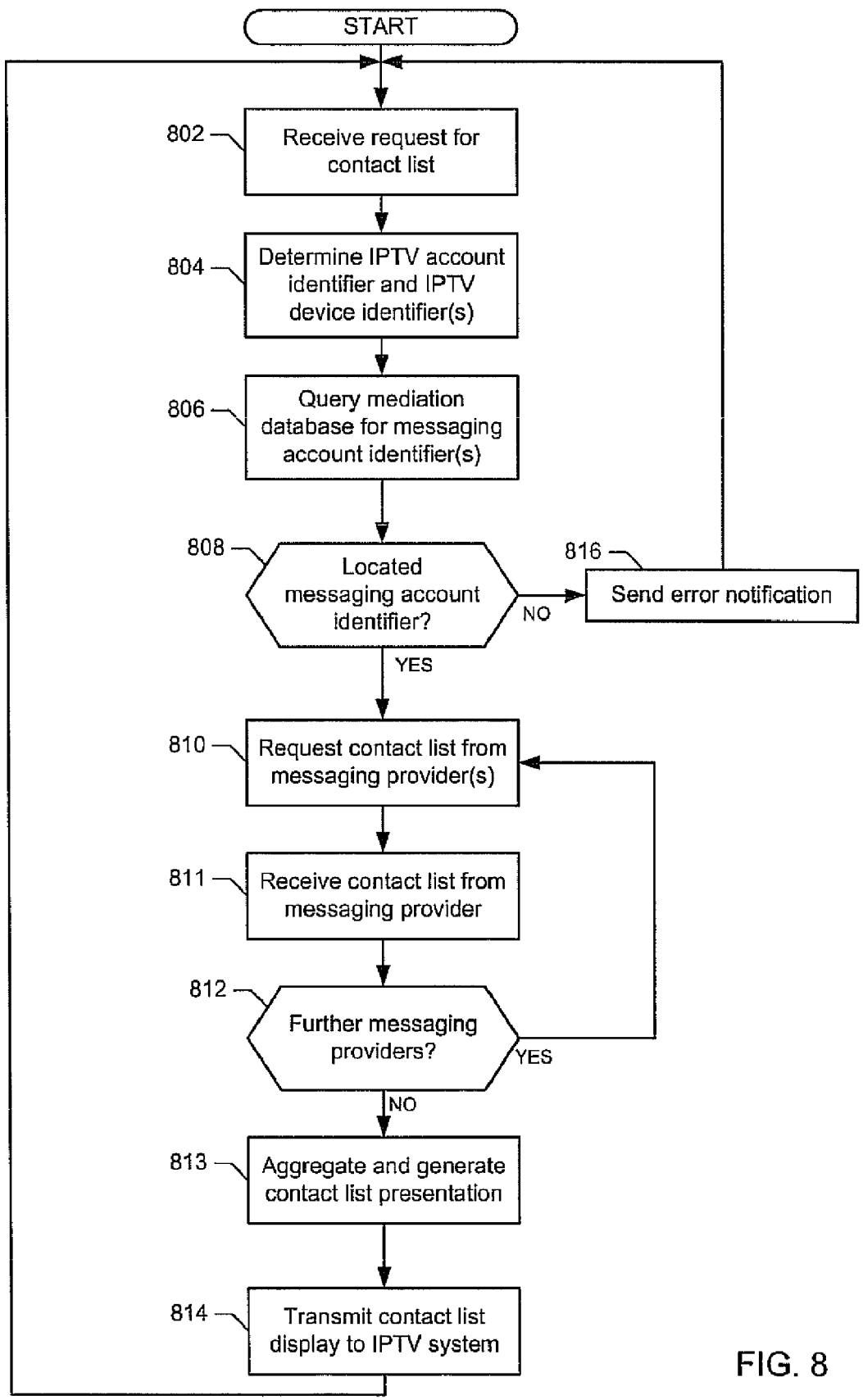

FIG. 8 is a flowchart representative of example machine readable instructions that may be executed to handle a request for a contact list (e.g., an address book or any other list of messaging contacts) at the example mediation system 106 of FIG. 1. The example machine readable instructions of FIG. 8 begin when the request receiver 216 of FIG. 2 receives a request for a contact list (block 802). The request may be for a contact list from a specific messaging provider, from a subset of messaging providers, or from all available messaging providers. The request receiver 216 then determines an IPTV account identifier and IPTV device identifiers associated with the request (block 804). For example, the request receiver 216 may parse the request to determine the source of the request, may receive IPTV account identification information from the IPTV system 110 of FIG. 1, etc.

After determining an IPTV account identifier associated with the request (block 804), the example request receiver 216 queries the mediation database 210 using the IPTV account identifier to determine one or more messaging account identifiers associated with the IPTV account (block 806). For example, the IPTV account identifier may be associated with a voicemail account, a text messaging account, and an email account. The example request receiver 216 then determines if a messaging account identifier associated with the IPTV account identifier was located (block 808). If a messaging account identifier was not located, the request receiver 216 sends an error notification to the IPTV system 110 (block 816). Control then returns to block 802 to wait for the next request.

If one or more of messaging account identifier(s) were located (block 808), the example request receiver 216 sends a request to the one or more message providers associated with the located messaging account identifier(s) requesting a contact list via the corresponding messaging transceiver 202 (block 810). The messaging transceiver 202 then receives one or more contact list(s) from the messaging provider(s) and sends the received contact list(s) to the message presenter 208 via the message converter 206 (block 811). The example request receiver 216 then determines if there are further messaging providers identified by the messaging account identifier(s) (block 812). If there are further messaging providers, control returns to block 810 to continue requesting contact lists.

If there are no further messaging providers (block 812), the example message presenter 208 receives the contact list(s), aggregates all received contact lists into a single aggregate contact list, and generates a presentation of the aggregate contact list to be presented via the IPTV system 110 (block 813). The example message presenter 208 then transmits the aggregate contact list presentation to the IPTV system 110 for presentation at the user location 102 (block 814).

In an alternate implementation, the message presenter 208 may not aggregate that the received contacts lists. Rather, the message presenter 208 may process each contact list for presentation individually.

Figure 9:
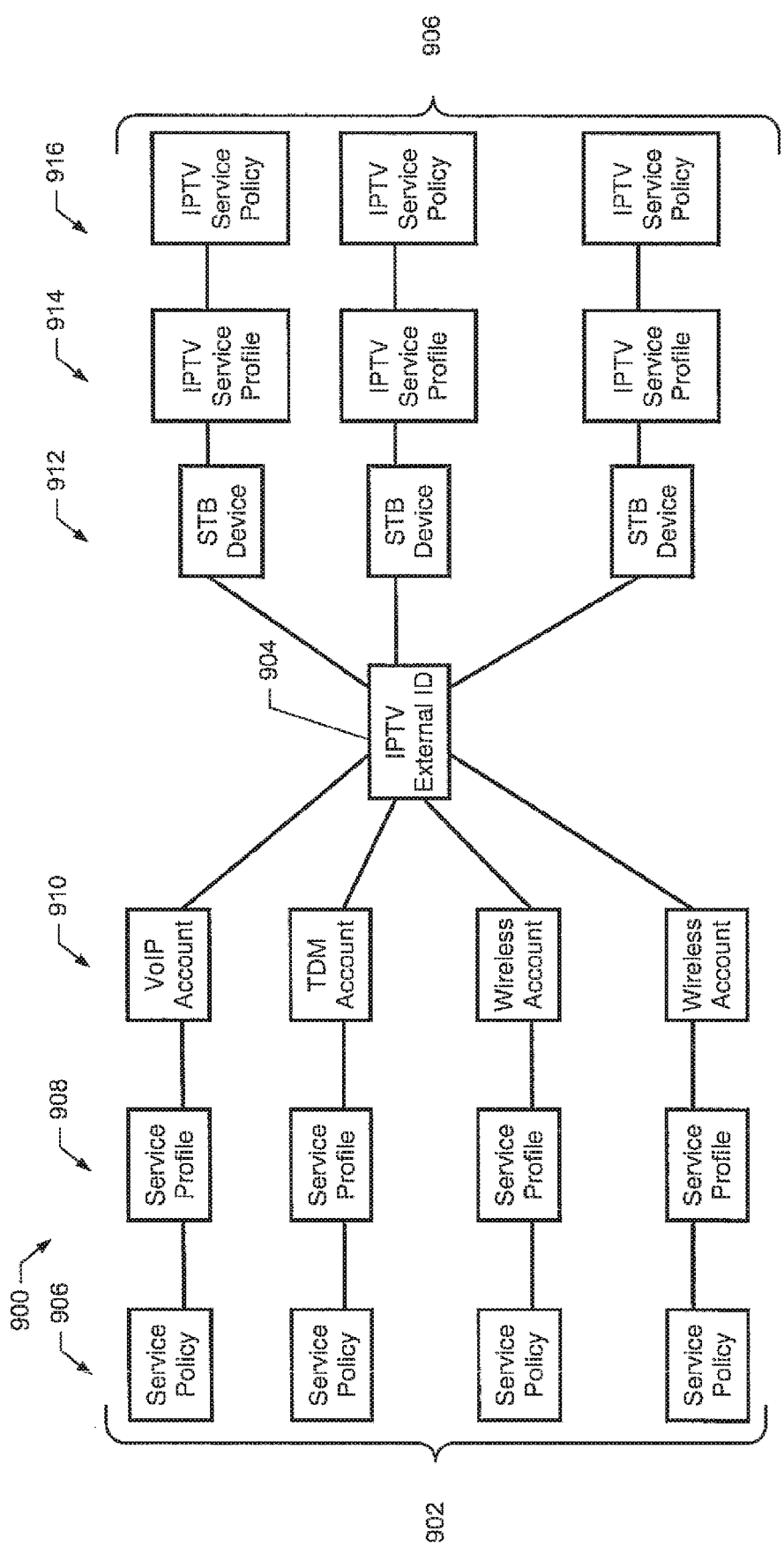
FIG. 9 illustrates an example data schema that illustrates how messaging accounts may be linked to IPTV devices via an IPTV external identifier.

FIG. 9 illustrates an example data schema 900 that illustrates how messaging accounts may be linked to IPTV devices via an IPTV external identifier. The message accounts 902 include a service policy 906, a service profile 908, and an account identifier 910. In the illustrated example, a VoIP account, a time division multiplexing (TDM) account, and two wireless accounts. The service policy 906 defines features that can be used by a user of the particular message account and/or how those features may be used (e.g., call forwarding may be enabled by a messaging provider, but may be disabled by a user to prevent its use). The service profile 908 defines what features are enabled for a particular messaging account. The account identifier 910 provides a unique identification for a particular messaging account (e.g., a phone number).

The IPTV external identifier 904 is a unique identifier for a particular IPTV account. The IPTV external identifier 904 is linked to one or more message accounts (e.g., linked in the mediation database 210 of FIG. 2). The IPTV external identifier 904 may be associated with multiple IPTV device (e.g., multiple devices at multiple locations in a consumer household). The IPTV external identifier is linked to a device identifier 912 (e.g., a set top box device identifier) for each IPTV device. The device identifier 912 is linked to an IPTV service profile 914 for the IPTV device. The IPTV service profile 914 defines the features that are available from a provider for a particular IPTV device (e.g., digital video recording capabilities, channel packages that are enabled, pay per view purchasing, etc.). The IPTV service profile 914 is linked to an IPTV service policy 916 for associated the IPTV device. The IPTV service policy 916 defines which features are enabled for a particular IPTV device. For example, the IPTV service policy 916 may specify that message presentation is disabled for a particular device, even though message presentation is enabled for the IPTV account and message presentation is available at other IPTV devices. The IPTV Service profile 914 may contain the content presentation format information, for example, a list of supported audio formats (e.g., WAV, WMA, etc.), a text presentation style definition, etc. The IPTV service policy 914 may additionally include information such as a setting for enabling or disabling new message notification, a setting for enabling or disabling message list summary presentation, etc.

Figure 10:
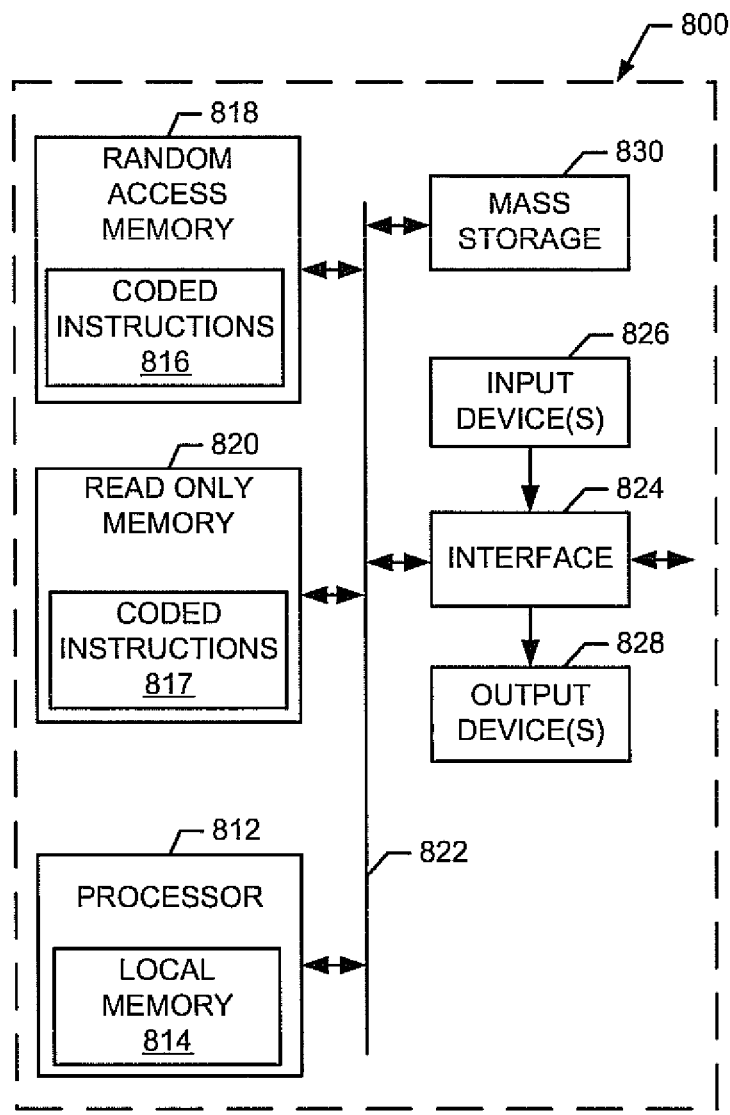
FIG. 10 is a block diagram of an example computer that may execute the machine readable instructions of FIGS. 3 to 8 to implement the example system of FIG. 1.

FIG. 10 is a block diagram of an example computer 1000 capable of executing the machine readable instructions illustrated in FIGS. 3 to 10 to implement the mediation system 106 and/or the other apparatus and/or methods disclosed herein.

The system 1000 of the instant example includes a processor 1012 such as a general purpose programmable processor. The processor 1012 includes a local memory 1014, and executes coded instructions 1016 present in random access memory 1018, coded instruction 1017 present in the read only memory 1020, and/or instructions present in another memory device. The processor 1012 may execute, among other things, the machine readable instructions represented in FIGS. 3 to 8. The processor 1012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1025. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   in response to a request from a consumer electronics device for messaging information stored with at least one of a first message provider or a second message provider, determining, with a processor of a mediation system, an identifier associated with the consumer electronics device;
   querying, with the processor, a database at the mediation system to determine first and second account identifiers associated with the identifier of the consumer electronics device;
   when the request is for the messaging information stored with the first message provider, sending, with the processor, a first command to cause the first message provider to forward the messaging information associated with the first message account identifier to the mediation system;
   when the request is for the messaging information stored with the second message provider, sending, with the processor, a second command to cause the second message provider to forward the messaging information associated with the second message account identifier to the mediation system; and
   sending, with the processor, the messaging information received from at least one of the first message provider or the second message provider to the consumer electronics device.

2. The method as defined in claim 1, wherein the messaging information includes at least one of a new message notification, a message list, a message, a message list summary or a contact list.

3. The method as defined in claim 2, wherein the messaging information received from the first message provider includes a first contact list, the messaging information received from the second message provider includes a second contact list, and further including:
   compiling the first contact list and the second contact list into an aggregate contact list, the sending of the message information to the consumer electronics device including sending the aggregate contact list to the consumer electronics device.

4. The method as defined in claim 1, wherein the first messaging account identifier identifies at least one of a voicemail account, a text messaging account, or an email account.

5. The method as defined in claim 1, wherein the consumer electronics device is an Internet protocol television device.

6. The method as defined in claim 1, wherein the first messaging account identifier is associated with at least one of a voice over internet protocol service, a mobile phone service, or a public switched telephone network service.

7. The method as defined in claim 2, wherein the first messaging account identifier identifies at least one of a voicemail account, a text messaging account, or an email account.

8. A mediation system, comprising:
a memory including machine readable instructions; and
a processor to execute the instructions to:
in response to a request from a consumer electronics device for messaging information stored with at least one of a first message provider or a second message provider, determine an identifier associated with the consumer electronics device;
query a database at the mediation system to determine first and second account identifiers associated with the identifier of the consumer electronics device;
when the request is for the messaging information stored with the first message provider, send a first command to cause the first message provider to forward the messaging information associated with the first message account identifier to the mediation system;
when the request is for the messaging information stored with the second message provider, send a second command to cause the second message provider to forward the messaging information associated with the second message account identifier to the mediation system; and
send the messaging information received from at least one of the first message provider or the second message provider to the consumer electronics device.

9. The mediation system as defined in claim 8, wherein the messaging information includes at least one of a new message notification, a message list, a message, a message list summary or a contact list.

10. The mediation system as defined in claim 9, wherein the messaging information received from the first message provider includes a first contact list, the messaging information received from the second message provider includes a second contact list, and the processor is further to:
compile the first contact list and the second contact list into an aggregate contact list, the sending of the message information to the consumer electronics device includes sending the aggregate contact list to the consumer electronics device via a terminal session.

11. The mediation system as defined in claim 8, wherein the first messaging account identifier identifies at least one of a voicemail account, a text messaging account, or an email account.

12. The mediation system as defined in claim 8, wherein the consumer electronics device is an Internet protocol television device.

13. A storage device including instructions that, when executed, cause a processor at a mediation system to perform operations comprising:
in response to a request from a consumer electronics device for messaging information stored with at least one of a first message provider or a second message provider, determining an identifier associated with the consumer electronics device;
querying a database at the mediation system to determine first and second account identifiers associated with the identifier of the consumer electronics device;
when the request is for the messaging information stored with the first message provider, sending a first command to cause the first message provider to forward the messaging information associated with the first message account identifier to the mediation system;
when the request is for the messaging information stored with the second message provider, sending a second command to cause the second message provider to forward the messaging information associated with the second message account identifier to the mediation system; and
sending the messaging information received from at least one of the first message provider or the second message provider to the consumer electronics device.

14. The storage device as defined in claim 13, wherein the messaging information includes at least one of a new message notification, a message list, a message, a message list summary or a contact list.

15. The storage device as defined in claim 14, wherein the messaging information received from the first message provider includes a first contact list, the messaging information received from the second message provider includes a second contact list, and the operations further include:
compiling the first contact list and the second contact list into an aggregate contact list, the sending of the message information to the consumer electronics device including sending the aggregate contact list to the consumer electronics device via a terminal session.

16. The storage device as defined in claim 13, wherein the first messaging account identifier identifies at least one of a voicemail account, a text messaging account, or an email account.

* * * * *